US006230124B1

(12) United States Patent
Maeda (10) Patent No.: US 6,230,124 B1
(45) Date of Patent: May 8, 2001

(54) CODING METHOD AND APPARATUS, AND DECODING METHOD AND APPARATUS

(75) Inventor: Yuuji Maeda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/170,726

(22) Filed: Oct. 14, 1998

(30) Foreign Application Priority Data

Oct. 17, 1997 (JP) .................................................. 9-285903

(51) Int. Cl.[7] .................................................. G10L 21/00
(52) U.S. Cl. ........................... 704/227; 704/228; 704/222
(58) Field of Search .................................. 704/207, 208, 704/214, 219, 220, 222, 223, 226, 227, 228

(56) References Cited

U.S. PATENT DOCUMENTS

| | | | |
|---|---|---|---|
| 5,073,940 | * 12/1991 | Zinser et al. ........................ | 704/226 |
| 5,255,343 | * 10/1993 | Su ....................................... | 704/242 |
| 5,371,853 | * 12/1994 | Kao et al. ........................... | 704/223 |
| 5,473,727 | * 12/1995 | Nishiguchi et al. ................ | 704/222 |
| 5,909,663 | *  6/1999 | Iijima et al. ....................... | 704/226 |

OTHER PUBLICATIONS

Performance of Pitch Synchronous Multi–Band (PSMB) Speech Coder with Error–Correction Coding, Yang et al., IEEE Global Telecommunications Conference, Nov. 14, 1995, pp. 1590–1594.

ITU–T 8–kbit/s Standard Speech Codec for Personal Communication Services, Kataoka et al., IEEE International Conference on Universal Personal Communications, Nov. 6, 1995, vol. CONF 4, pp. 812–822.

Comparative Study of Error Correction Coding Schemes for the GSM Half–Rate Channel, Nielsen et al., Proceedings of the International Conference on Acoustics, Mar. 26, 1992, vol. CONF. 17, pp. 129–132.

CELP Coding at 6.55 KBIT/S For Digital Mobile Radio Communications, Drugo De Iacovo et al., Proceedings of the Global telecommunications Conference and Exhibition, Dec. 5, 1990, vol. 1, pp. 538–541.

NATO STANAG 4479: A Standard for an 800 BPS Vocoder and Channel Coding in HF–ECCM System, Mouy et al., Proceedings of the International Conference on Acoustics, Speech, and Signal Processing, May 9, 1995, pp. 480–483.

* cited by examiner

*Primary Examiner*—Richemond Dorvil
*Assistant Examiner*—Angela Armstrong
(74) *Attorney, Agent, or Firm*—Jay H. Maioli (57) ABSTRACT

An audio encoder 3 divides on a time axis an input audio signal into predetermined coding units and executes coding to each of the coding units so as to output a plurality of types of audio coded parameters. A cyclic redundancy check (CRC) code calculation block 5 selects important bits relative to human hearing from the audio coded parameters of the plurality of types from the audio encoder 3, and creates a CRC check code from the important bits. A convolution encoder 6 executes a convolution coding to the CRC check code and the important bits from the CRC code calculation block.

10 Claims, 7 Drawing Sheets

CODING METHOD AND APPARATUS, AND DECODING METHOD AND APPARATUS

BACKGROUND OF THE INVENTION

1. Field of the Invention

The present invention relates to a coding method and apparatus for dividing an input audio signal into predetermined coding units such as blocks and frames and carrying out a coding processing to each of the coding units, as well as a decoding method and apparatus for decoding the coded signal.

2. Description of the Prior Art

There are known various coding methods carrying out signal compression by utilizing statistical features and human hearing sense characteristic in the time region and frequency region of an audio signal (including a sound signal and an acoustic signal). As such a coding method, there is a so-called CELP (code excited linear prediction) coding such as a VSEL (vector sum excited linear prediction) coding method and a PSI-CELP (pitch synchronous innovation—CELP) coding method which are now in a spotlight as a low bit rate audio coding method.

In a waveform coding method such as the CELP coding method, a predetermined number of samples of an input audio signal are used as a coding unit such as a block r frame, so that each block or frame of audio time axis waveform is subjected to the analysis-by-synthesis method so as to carry out a closed loop search of a optimal vector for quantization of the waveform and output an index of the vector.

A coded bit obtained by the aforementioned audio coding method of a low bit rate such as 2 kbps or 4 kbps can be widely applied as an audio in general to communication, computers, broadcasting, and the like, irrespective of particular audio information contents. Accordingly, it should be strictly protected against an error caused in a transmission path.

If an error is repeatedly caused in a transmission path, audio decoding is accompanied by a long time of missing sound, deteriorating the audio quality.

SUMMARY OF THE INVENTION

It is therefore an object of the present invention to provide a coding method and apparatus and a decoding method and apparatus that are tough against the transmission path error, enabling to improve the quality lowering.

In order to achieve the aforementioned object, the coding method according to the present invention includes: an audio coding step for dividing on a time axis an input audio signal into predetermined coding units and coding each of the coding units so as to output a plurality of types of audio coded parameters; an error detection code creation step for selecting important bits for the hearing sense from the plurality of types of audio coded parameters from the audio coding step, and creating an error check code from the important bit group; and a convolution coding step for executing a convolution coding to the error check code and the important bit group from the error check code creation step. Consequently, it is possible to protect important bits for the hearing sense, from a transmission path error.

Here, the audio coding step includes: a short period prediction residue calculation step for obtaining a short period prediction residue of the input audio signal; a sinusoidal wave analysis coding step for executing a sinusoidal wave analysis coding to the short period prediction residue obtained; and a waveform coding step for coding the input audio signal by way of waveform coding.

Moreover, the error check code creation step selects as the important bits: some or all of the parameters created when the short period prediction residue is obtained in the short period prediction residue calculation step; some or all of the coded outputs of the sinusoidal wave analysis coding step; and some or all of coded outputs from the waveform coding step, and creates an error check code from the important bits.

It should be noted that the aforementioned parameters created to obtain a short period prediction residue by the short period prediction residue calculation step are linear spectrum pair parameters forming an outline of a frequency spectrum of the input audio signal; the coded outputs from the sinusoidal wave analysis coding step include a voiced/unvoiced decision parameter indicating whether the input audio signal is voiced or unvoiced, and a pitch parameter if the input audio signal is voiced, and a spectrum codebook index and gain index indicating a spectrum envelope of the short period prediction coding residue; and the coded output from the waveform coding step is a noise codebook index and gain index based on the short period prediction residue when the input signal is unvoiced.

Moreover, in order to achieve the aforementioned object, the coding apparatus according to the present invention includes: audio coding means for dividing on a time axis an input audio signal into predetermined coding units and coding each of the units so as to output a plurality of types of audio coded parameters; error check code creation means for selecting important bits for the hearing sense from the plurality of types of audio coded parameters from the audio coding means, and creating an error check code from the important bits; and convolution coding means for executing a convolution coding to the error check code and the important bits from the error check code creation means.

Moreover, the decoding method according to the present invention is for decoding a coded data obtained from an input audio signal which has been divided on a time axis into predetermined units which have been coded to obtain a plurality of types of audio coded parameters from which important bits for the hearing sense have been used to create an error check code, wherein the error check code and the important bits have been subjected to a convolution coding to obtain a coded output which has been adjoined with non-important bits for transmission, the decoding method comprising: a convolution decoding step for executing a convolution decoding to the convolution-coded output so as to obtain a decoded output from the important bits added with the error check code and the non-important bits; an error check step for checking a transmission error using the error check code added to the convolution-decoded output from the convolution decoding step; an output adjustment step for adjusting the convolution-decoded output according to a result of the error check in the error check step; and an audio decoding step for executing an audio decoding processing to the convolution-decoded output from the output adjustment step.

Here, if an error is detected in the error check step, the output adjustment step outputs an interpolated data obtained by an interpolation processing instead of the convolution-decoded output.

Moreover, the output adjustment step executes a bad frame masking processing to the convolution-decoded output according to a result of the error check.

Moreover, the decoding apparatus according to the present invention is for decoding a coded data obtained from an input audio signal which has been divided on a time axis into predetermined units which have been coded to obtain a plurality of types of audio coded parameters from which important bits for the hearing sense have been used to create an error check code, wherein the error check code and the important bits have been subjected to a convolution coding to obtain a coded output which has been adjoined with non-important bits for transmission, the decoding apparatus including: convolution decoding means for executing a convolution decoding to the convolution-coded output so as to obtain a decoded output from the important bits added with the error check code and the non-important bits; error check and output adjustment means for checking a transmission error using the error check code added to the convolution-decoded output from the convolution decoding means and adjusting the convolution-decoded output according to a result of the error check; and audio decoding means for executing an audio decoding processing to the convolution-decoded output from the error check and output adjustment means.

DETAILED DESCRIPTION OF PREFERRED EMBODIMENTS

Description will now be directed to a coding method and apparatus and a decoding method and apparatus according to an embodiment of the present invention.

Figure 1:
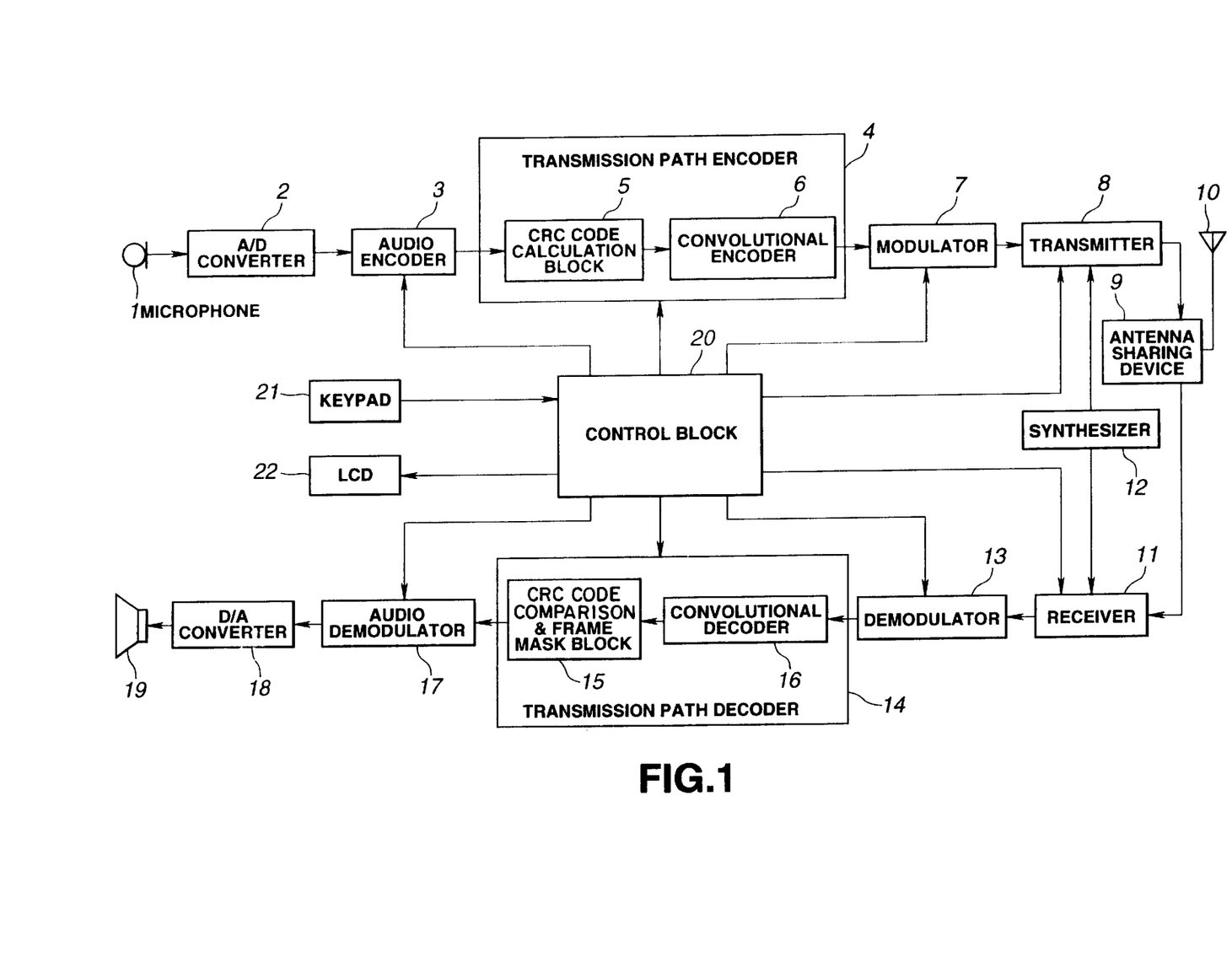
FIG. 1 is a block diagram showing a basic configuration of a mobile telephone apparatus as an embodiment of the coding method and apparatus and the decoding method and apparatus according to the present invention.

FIG. 1 shows a mobile telephone apparatus including: an audio encoder 3 and a transmission path encoder 4 constituting the coding apparatus, and a transmission path decoder 14 and an audio decoder 17 constituting the decoding apparatus according to the embodiment of the present invention. The transmission path encoder 4 has a CRC code calculation block 5 and a convolution encoder 6. The transmission decoder 14 has a convolution decoder 16 and a CRC code compare block & frame mask block 15.

That is, in this mobile telephone apparatus, the coding apparatus employing the coding method according to the present invention includes: the audio encoder 3 that divides an input audio signal on a time axis into predetermined units, carries out encoding for each unit, and outputs a plurality of types of audio coded parameters; the CRC code calculation block 5 that selects an important bit group for the hearing sense, among the plurality of types of audio coded parameters from the audio encoder 3 so as to create a CRC (cyclic redundancy check) code; and the encoder 6 that carries out convolution coding to the aforementioned CRC code and the important bit group from the CRC code calculation block 5.

Moreover, in this mobile telephone apparatus, the decoding apparatus employing the decoding method according to the present invention decodes a convolution-coded output. That is, an input audio signal is divided on a time axis into predetermined units, each of which is subjected to coding so as to obtain a plurality of types of audio coding parameters, from which an important bit group for the hearing sense is used to create a CRC code. The CRC code thus created and the aforementioned important bit group are subjected to a convolution coding to obtain a convolution-coded output, which is combined with a rest of bit group from which the important bit group has been removed. This convolution-coded output combined with the rest of bit group is decoded by the decoding apparatus. The decoding apparatus includes: the convolution decoder 16 for carrying out a convolution decoding to the convolution-coded output and outputting the important bit group added by the CRC code and the rest of bit group as a decoded output; the CRC code comparison & frame mask block 15 for comparing the CRC code added to the convolution-decoded output from the convolution decoder 16, to a CRC error check code calculated from the rest of bit group and adjusting according to a comparison result, the aforementioned convolution-decoded output; and the audio decoder 17 for carrying out an audio decoding processing to the convolution-decoded output from this CRC code comparison & frame mask block 15.

In this mobile telephone apparatus, during a transmission, an audio signal inputted from a microphone 1 is converted by an A/D converter into a digital signal, which is coded by way of a low bit coding of 2 kbps/4 kbps by an audio encoder 3. The coded digital signal is further coded by a transmission path encoder so that the audio quality is not affected by the transmission path quality. After this, the digital signal is modulated by a modulator 7 and its output bit is subjected to a transmission processing by a transmitter 8 before transmitted from an antenna 10 via an antenna sharing device 9.

Moreover, during a reception, a radio wave caught by the antenna 10 is received via the antenna sharing device 9 by a receiver 11, demodulated by a demodulator 13, subjected to a transmission path error correction in a transmission path demodulator 14, decoded by an audio decoder 17, and converted by a D/A converter into an analog audio signal for output from a loud speaker 19.

Moreover, a control block 20 controls the aforementioned components, A synthesizer 12 supplies a transmission/ reception frequency to the transmitter 8 and the receiver 11. Moreover, a keypad 21 and an LCD display 22 are used for a man-machine interface.

In the mobile telephone apparatus having the aforementioned configuration, the CRC code calculation block 5 selects, as the aforementioned important bit group: a part of all of linear spectrum pair (LSP) parameters constituting frequency spectrum outline of the aforementioned audio signal; all of V/UV decision parameters indicating whether the audio signal is Voice (V) or Un-voice (UV); a part or all of pitch parameters if the audio signal is Voice; if the audio signal is Voice, a part or all of spectrum codebook index indicating a linear prediction coding (LPC) residual signal spectrum envelope and a gain index; and if the audio signal is Un-voice, a part or all of noise codebook index indicating a linear prediction coding (LPC) residual signal and a gain index. From these important bits a CRC code is created.

These important bits are obtained by the audio encoder 3. This audio encoder 3 carries out an audio coding including: a short-period prediction residue calculation step for determining a short-period residue of an input audio signal; sinusoidal wave analysis coding step for sinusoidal wave analysis coding of the obtained short-period residue; and a waveform coding step for coding the input audio signal by way of waveform coding. This audio encoder 3 will be detailed below with reference to FIG. 2 and FIG. 3.

Figure 2:
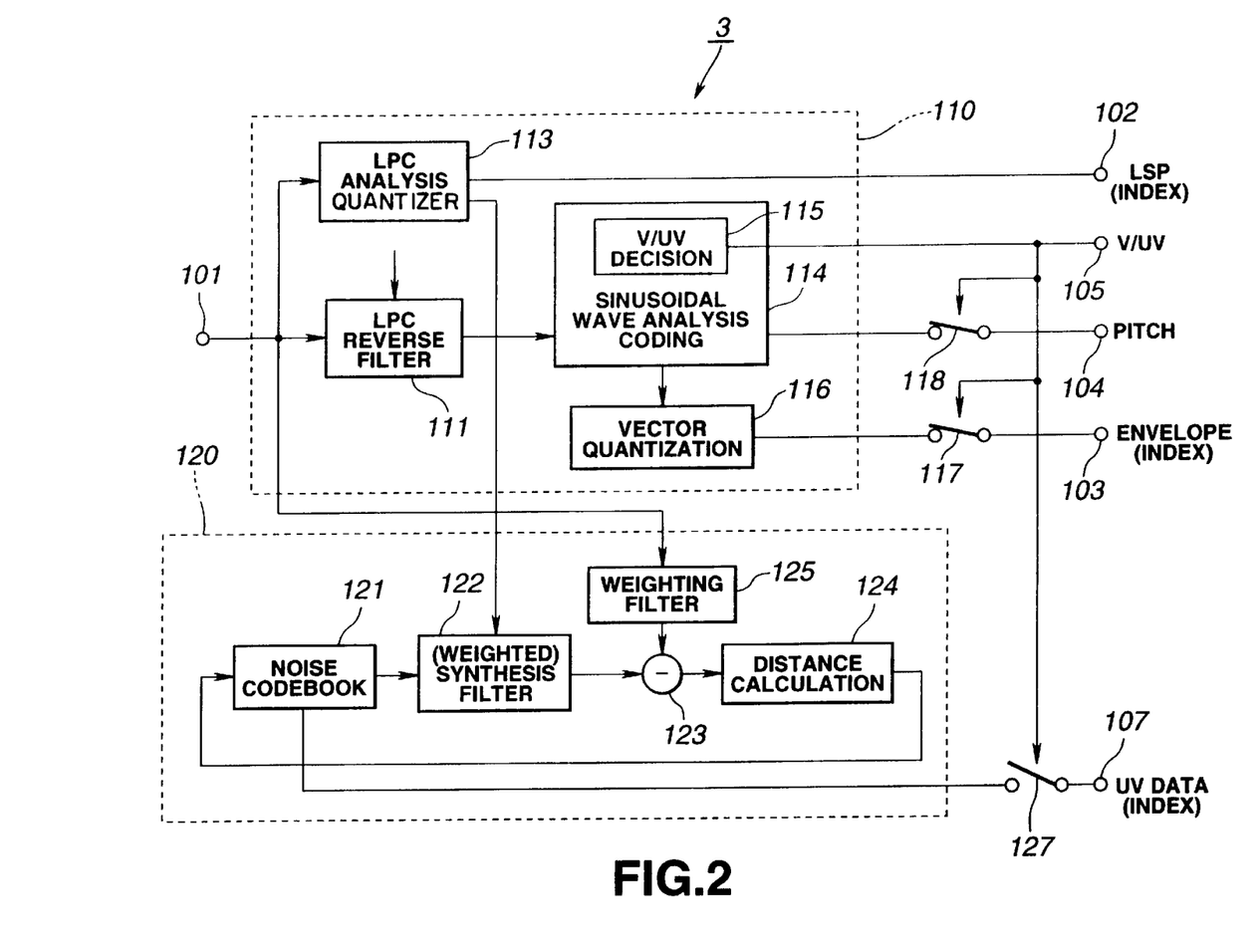
FIG. 2 is a block diagram showing a basic configuration f an audio encoder constituting the mobile telephone apparatus.

The audio encoder 3 of FIG. 2 is based on a use of two encoders: a first encoding block 110 that determines a short-period prediction residue of the input audio signal such as an LPC (linear prediction coding) residue and carries out a sinusoidal wave analysis coding such as a harmonic coding; and a second encoding block 120, so that the first encoding block 110 is used for coding a voiced (V) part of the input signal and the second encoding block 120 is used for coding an unvoiced (UV) part of the input signal.

The first encoding block 110 has a configuration for carrying out a sinusoidal wave analysis coding of the LPC residue such as harmonic coding and multi-band excitation (MBE) coding. The second encoding block 120, for example, has a configuration for carrying out code excitation linear prediction (CELP) coding using a vector quantization by way of a closed loop search of an optimal vector using an analysis based on synthesis.

In the example of FIG. 2, an audio signal supplied to an input terminal 101 is fed to an LPC reverse filter 111 and an LPC analysis-quantization block 113 of the first encoding block 110. An LPC coefficient, i.e., a so-called α parameter, obtained from the LPC analysis-quantization block 113 is supplied to the LPC reverse filter 111. This LPC reverse filter 111 extracts a linear prediction residue (LPC residue of the input audio signal. Moreover, the LPC analysis-quantization block 113 outputs a quantized output of an LSP (linear spectrum pair) as will be detailed later, and this output is fed to an output terminal 102. The LPC residue from the LPC reverse filter 111 is fed to a sinusoidal wave coding block 114. The sinusoidal wave analysis coding block 114 carries out a pitch detection and a spectrum envelope amplitude calculation as well as makes a V/UV decision in a V (Voiced)/UV (Unvoiced) decision block 115. The sinusoidal wave analysis coding block 114 supplies a spectrum envelope amplitude data to a spectrum quantization block 116. The vector quantization block 116 outs as a vector-quantized output of the spectrum envelope, a codebook index, which is supplied via a switch 117 to an output terminal 103. An output from the sinusoidal wave analysis coding block 114 is fed via a switch 118 to an output terminal 104. Moreover, a result of the V/UV decision from the V/UV decision block 115 is fed to an output terminal 105 as well as fed as a control signal of switches 117 and 118. In case of the aforementioned voiced (V), the aforementioned index and the pitch are selected and taken out from the output terminals 103 and 104, respectively.

The second coding block 120 of FIG. 2 has a CELP (code excitation linear prediction) coding configuration. An output from a noise codebook 121 is synthesized by a weighted synthesis filter 122. A weighted audio obtained is fed to a subtracter 123, where a difference between the weighted audio and the audio signal supplied to the input terminal 101 and fed to a weighted filter 125 is determined. This error difference is fed to a distance calculation circuit 124 for distance calculation, and a a vector minimizing the error difference is searched in the noise codebook 121. Thus, the analysis-by-synthesis method is used in the closed loop search for vector quantization of a time axis waveform. This CELP coding is used, as has been described above, for the Unvoiced part. The codebook index as an UV data from the noise codebook 121 is fetched from an output terminal 107 via a switch 127 that turns on when the V/UV decision result from the V/UV decision block 115 is Unvoiced (UV).

Figure 3:
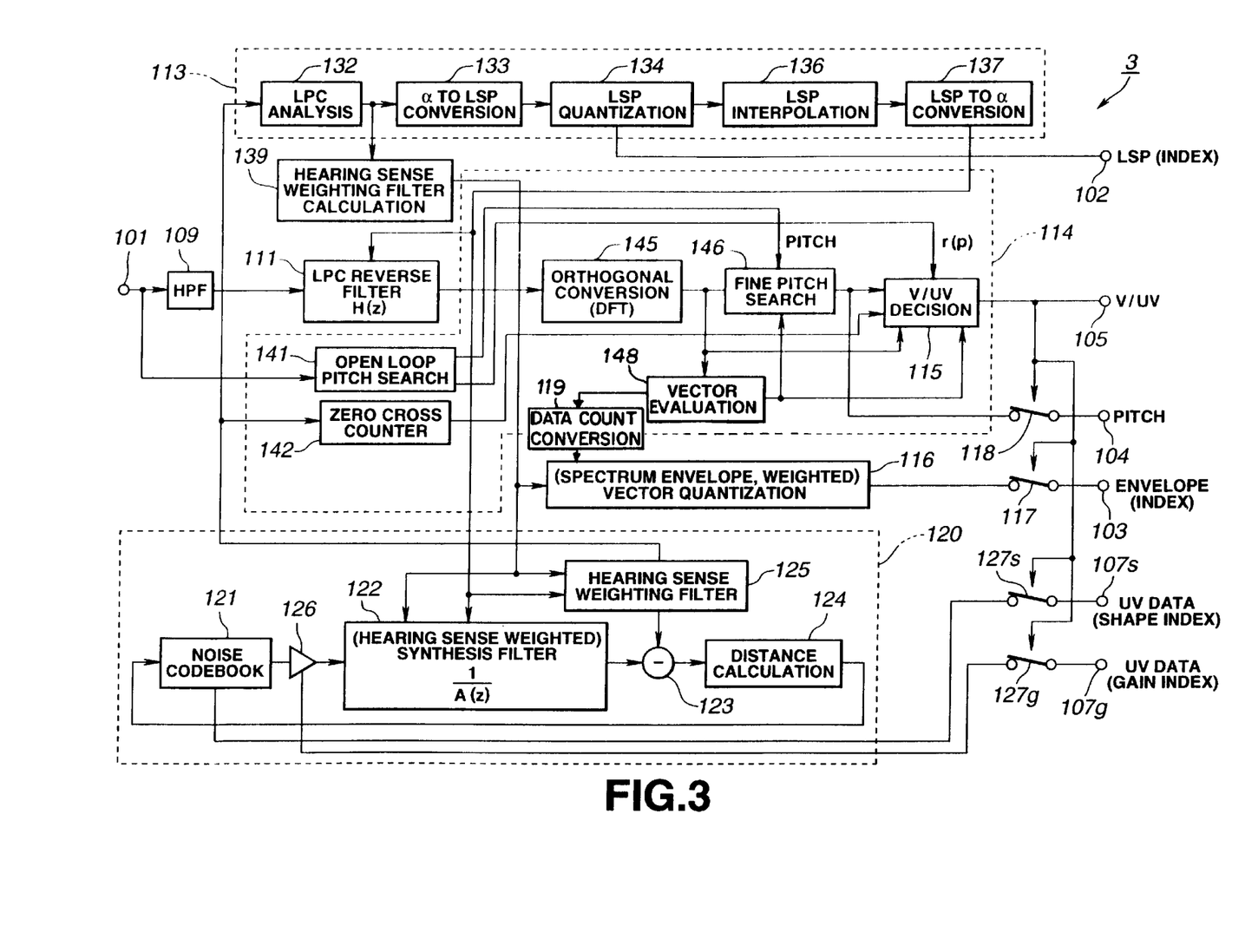
FIG. 3 is a block diagram showing a detailed configuration of the audio encoder.

FIG. 3 shows a more specific configuration of the audio encoder 3 shown in FIG. 2. In this FIG. 3, like components as in FIG. 2 are denoted by like reference symbols.

In the audio encoder shown in FIG. 3, the audio signal fed to the input terminal 101 is subjected to a filter processing in a high-pass filter (HPF) 109 to remove a signal of unnecessary band, and transmitted to an LPC analysis circuit 132 and an LPC reverse circuit 111 of the LPC (linear prediction coding) analysis-quantization block 113.

The LPC analysis circuit 132 of the LPC analysis-quantization block 113 applies a Hamming window to one block of the input signal waveform consisting of about 256 samples, so as to obtain a linear prediction coefficient, i.e., a so-called α parameter by way of the self-correlation method. The framing interval that is a data output unit is about 160 samples. When the sampling frequency fs is 8 kHz, for example, the frame interval 160 samples in 20 msec.

The α parameter from the LPC analysis circuit 132 is fed to an α-LSP conversion circuit 133 so as to be converted into a linear spectrum pair (LSP) parameter. That is, α parameters obtained as a direct type filter coefficient are converted into ten, i.e., five pairs of LSP parameters. The conversion is carried out, for example, by using the Newton-Raphson method or the like. The LSP parameter has a superior interpolation characteristic than the α parameter.

The LSP parameter from the α-LSP conversion circuit 133 is matrix-quantized or vector-quantized by an LSP quantizer 134. Here, it is possible to determine a difference between frames before vector quantization or to carry out a matrix quantization of a plurality of frames at once. Here, 20 msec constitutes one frame, and two frames of LSP parameters, each calculated per 20 msec, are subjected to matrix quantization and vector quantization.

The quantized output from this LSP quantizer 134, i.e., the LSP quantization index is taken out via the terminal 102, and the LSP vector quantized is fed to the LSP interpolation circuit 136.

The LSP interpolation circuit 136 interpolates LSP vectors quantized for each 20 msec or 40 msec into a rate multiplied by 8, so that the LSP vector is updated for each 2.5 msec. The residual waveform subjected to analysis-synthesis by way of harmonic coding decoding method becomes a synthesized waveform having a very gentle and smooth envelope. If the LPC coefficient changes abruptly every 20 msec, an abnormal noise is generated. Generation of such an abnormal noise can be prevented if the LPC coefficient is gradually changed for every 2.5 msec.

In order to carry out such a reverse filtering of the input audio is carried out using the LSP vector interpolated every 2.5 msec, an LSP-α conversion circuit 137 converts the LSP parameter into an α parameter which is a coefficient of a direct type filter of about 10-th order for example. An output from this LSP-α conversion circuit 137 is fed to the aforementioned LPC reverse filter 111. This LPC reverse filter 111 carries out a reverse filtering with the α parameter updated every 2.5 msec, so as to obtain a smooth output. An output from this LPC reverse filter 111 is fed to the sinusoidal wave analysis coding block 114, more specifically, to an orthogonal conversion circuit 145 of the harmonic coding circuit such as a DFE (discrete Fourier transform) circuit for example.

The α parameter from the LPC analysis circuit 132 of the LPC analysis-quantization block 113 is fed to a hearing sense weighting filter calculation circuit 139 to obtain a data for hearing sense weighting. This weighting data is fed to a vector quantizer 116 having a hearing sense weight and the second coding block 120, i.e., a hearing sense weighting filter 125 and a hearing sense weighted synthesis filter 122.

In the sinusoidal wave analysis coding block 114 such as a harmonic coding circuit, an output from the LPC reverse filter 111 is analyzed by way of the harmonic coding method. That is, pitch detection, calculation of each harmonics amplitude Am, identification of voiced (V)/Unvoiced (UV) are carried out so as to make constant the harmonics envelope changing according to the pitch or the number of amplitudes Am by carrying out dimension conversion.

In the specific example of sinusoidal wave analysis coding block 114 shown in FIG. 3, an ordinary harmonic coding is assumed. In case of MBE (multi-band excitation) coding, it is assumed that a Voiced part and an Unvoiced part are present in each band, i.e., a frequency axis region at the same time (within a block or frame). In the other harmonic coding, an audio within a block or frame is determined either Voiced or Unvoiced. It should be noted that in the explanation given below, the V/UV within a frame, when applied to the MBE coding, is decided in such a manner that if the entire band is UV, then the frame is determined to be UV. The aforementioned MBE analysis-synthesis method is detailed in the Specification and Drawing of Japanese Patent Application 4-91422 filed by the applicant of the present invention.

The sinusoidal wave analysis coding block 114 in FIG. 3 has an open loop pitch search block 141 which is supplied with the input audio signal from the input terminal 101 and a zero cross counter 142 which is supplied with a signal from the aforementioned HPF (high pass filter) 109. In the sinusoidal wave analysis coding block 114, the orthogonal conversion circuit 145 is supplied with the LPC residue or linear prediction residue from the LPC reverse filter 111. I the open loop search block 141, according to the LPC residue of the input signal, a comparatively rough pitch search is carried out using an open loop. A rough pitch data extracted is fed to a high-accuracy pitch search 146, so that a fine pitch search is carried out using a closed loop as will be detailed later. The open loop pitch search block 141 outputs, together with the aforementioned rough pitch data, a maximum value of the self correlation of the LPC residue normalized by power, i.e., a normalized self-correlation maximum value r (p), which is fed to the V/UV decision block 115.

In the orthogonal conversion circuit 145, an orthogonal conversion processing such as DFT (discrete Fourier transform) is carried out so as to convert the LPC residue on the time axis, into a spectrum amplitude data on the frequency axis. An output from this orthogonal conversion circuit 145 is fed to a fine pitch search block 146 and to a spectrum evaluation block 148 for evaluating the spectrum amplitude or envelope.

The fine pitch search block 146 is supplied with the comparatively rough pitch data extracted in the open loop pitch search block and the DFT-ed data on the frequency axis from the orthogonal conversion block 145. In this fine pitch search block 146, a few samples tried above and below the aforementioned rough pitch data at an interval of 0.2 to 0.5 so as to obtain an optimal floating fine pitch data value. The fine search method used here is a so-called analysis-by-synthesis method in which a pitch is selected in such a manner that a synthesized power spectrum is the nearest to the original audio power spectrum. The pitch data obtained in the fine pitch search block 146 using such a closed loop is fed via a switch 118 to an output terminal 104.

In the spectrum evaluation block 148, according to the spectrum amplitude and pitch as the orthogonal conversion output of the LPC residue, size of each harmonics and its set, i.e., spectrum envelope are evaluated. A result of this evaluation is fed to the fine pitch search block 146, the V/UV (voiced/unvoiced) decision block, and the hearing sense weighted vector quantizer 116.

The V/UV decision block 115 decides whether the frame is V or UV according to the output from the orthogonal conversion circuit 145, the optimal pitch from the fine pitch search block 146, the spectrum amplitude data from the spectrum evaluation block 148, the normalized self-correlation maximum value r (p) from the open loop pitch search block 141, and the zero cross count value from the zero cross counter 142. Furthermore, in case of the MBE, it is possible to use a boundary position of the V/UV decision result for each band as a condition of the V/UV decision of the frame. The decision output from this V/UV decision block 115 is taken out via the output terminal 105.

On the other hand, a data count conversion (a king of sampling rate conversion) block is provided in an output block of the spectrum evaluation block 148 or in an input block of the vector quantizer 116. This data count conversion block serves to keep a constant number of envelope amplitude data |Am|, taking consideration on that the number of divided bands on the frequency axis and the number of data varies depending on the aforementioned pitch. That is, if the effective band is assumed to be up to 3400 kHz for example, this effective band is divided into 8 to 63 bands according to the aforementioned pitch and accordingly, the number $m_{MX}+1$ of amplitude data |Am| obtained for each of the bands also varies from 8 to 63. To cope with this, the data count conversion block 119 converts the variable number $m_{MX}+1$ of amplitude data into a constant number M, for example, 44.

The data count conversion block provided in the output block of the spectrum evaluation block 148 or in the input block of the vector quantizer 116 output the constant number M (44 for example) of amplitude data or envelope data is gathered into a predetermined number, 44 of data for example, into a vector, which is subjected to weighted vector quantization. This weight is supplied by the output from the hearing sense weighting filter calculation circuit 139. The envelope index from the vector quantizer 116 is taken out from the output terminal 113 via a switch 117. It should be noted that prior to the weighted vector quantization, it is possible to obtain an inter-frame difference using an appropriate leak coefficient for a vector consisting of a predetermined number of data.

Next, explanation will be given on the second coding block 120. The second coding block 120 has a so-called CELP (code excitation linear prediction) coding configuration and is used especially for coding the Unvoiced part of the input audio. In this CELP coding configuration for the unvoiced part, a noise codebook, i.e., a so-called stochastic codebook 121 outputs a typical value of noise output corresponding to an unvoiced audio LPC residue, which is fed via a gain circuit 126 to a weighted synthesis filter 122. In this weighted synthesis filter 122, the noise inputted is subjected to an LPC synthesis processing and a weighted unvoiced audio obtained is fed to the subtracter 123. The subtracter 123 is also supplied with an audio signal supplied from the input terminal 101 via the HPF (high pass filter) and the hearing sense weighting filter 125 where the audio signal has been subjected to the hearing sense weighting. In the subtracter, a difference or error is obtained between this weighted signal and the signal from the synthesis filter 122. Note that it is assumed that the output from the hearing sense weighting filter 125 is in advance subtracted by a zero input response of the hearing sense weighted synthesis filter. The difference error obtained is fed to the distance calculation circuit 124 for distance calculation and a representative value vector minimizing the difference error is searched in the noise codebook 121. Thus, the vector quantization of the time axis waveform is carried out using the closed loop search by way of the analysis-by-synthesis.

From the second coding block 120 using the CELP coding configuration, as a data for the UV (unvoiced) part, a shape index of the codebook from the noise codebook 121 and a gain index of the codebook from the gain circuit 126 are taken out. The shape index which is a UV data from the noise codebook 121 is fed via the switch 127s to an output terminal 107s, whereas the gain index which is the UV data of the gain circuit 126 is fed via a switch 127g to an output terminal 107g

Here, these switches 127s and 127g as well as the aforementioned 117 and 118 are controlled to be on and off according to the V/UV decision result from the V/UV decision block 115. The switches 117 and 118 are controlled to be on when an audio signal of a current frame to be transmitted is decided to be voiced (V), whereas the switches 127s and 127g are controlled to be on when the audio signal of a current frame to be transmitted is decided to be unvoiced (UV).

Table 1 shows the parameters outputted by the audio encoder 3 having the aforementioned configuration: LSP parameter, voiced/unvoiced decision parameter, pitch parameter, spectrum envelope codebook parameter and gain index, noise codebook parameter and gain index, which are divided into to 2 k/4 kbps coding. Table 1 also describes the number of bits allocated.

TABLE 1

| Symbol | Description | Number of bits |
|---|---|---|
| LSP0 | 0-th LSP parameter | (6 bit) |
| LSP2 | 2nd LSP parameter | (6 bit) |
| LSP3 | 3rd LSP parameter | (5 bit) |
| LSP4 | 4th LSP parameter | (1 bit) |
| LSP5 | 5th LSP parameter | (8 bit) |
| VUV | Voiced/Unvoiced flag | (2 bit) |
| PCH | Pitch parameter | (7 bit) |
| idS0 | 0-th spectrum parameter | (4 bit) |
| idS1 | 1st spectrum parameter | (4 bit) |
| idG | Spectrum gain parameter | (5 bit) |
| idS0_4K | 0-th spectrum parameter for 4k | (7 bit) |
| idS1_4K | 1-st spectrum parameter for 4k | (10 bit) |
| idS2_4K | 2-nd spectrum parameter for 4k | (9 bit) |
| idS3_4K | 3-rd spectrum parameter for 4k | (6 bit) |
| idSL00 | 0-th noise codebook parameter | (6 bit) |
| idSL01 | 1-st noise codebook parameter | (6 bit) |
| idGL00 | 0-th noise codebook gain parameter | (4 bit) |
| idGL01 | 1-st noise codebook gain parameter | (4 bit) |
| idSL10 | 0-th noise codebook parameter for 4k | (5 bit) |
| idSL11 | 1-st noise codebook parameter for 4k | (5 bit) |
| idSL12 | 2-nd noise codebook parameter for 4k | (5 bit) |
| idSL13 | 3-rd noise codebook parameter for 4k | (5 bit) |
| idGL10 | 0-th noise codebook gain parameter for 4k | (3 bit) |

TABLE 1-continued

| Symbol | Description | Number of bits |
|---|---|---|
| idGL11 | 1-st noise codebook gain parameter for 4k | (3 bit) |
| idGL12 | 2-nd noise codebook gain parameter for 4k | (3 bit) |
| idGL13 | 3-rd noise codebook gain parameter for 4k | (3 bit) |

The aforementioned transmission path encoder 4 causes the CRC code calculation block 5 to select some or all of the parameters shown in Table 1 as the important bit group for hearing sense and calculate the CRC code. The CRC code and the important bit group are subjected to a convolution coding by the convolution encoder 6.

As shown in Table 2, in the case of 2 kbps, for 120 bits per 2 frames, 40 msec, 80 bits of important bit group is handled as class I and the other 40 bits are handled as class II.

TABLE 2

|  | 2k bps | 4k bps |
|---|---|---|
| Class I | 80 | 112 |
| CRC | 14 | 14 |
| TAIL | 10 | 10 |
| Total | 104 | 136 |
| Class II | 40 | 104 |
|  | 144 | 240 |
|  | (3.6k bps) | (8.0k bps) |

According to the 80 bits of class I, the CRC code calculation block 5 creates a CRC code of 14 bits. The convolution encoder 6 carries out a convolution coding using the 80 bits of class I, the 14-bit CRC code, and 10 table bits.

The 104 bits obtained by this convolution encoder 6 and the 40 bits of class II, i.e., the total of 144 bits are subjected to a bit interleave and 2-frame interleave for transmission, thus realizing an audio coding with 2 kbps. It should be noted that when the transmission is actually carried out, other redundant bits are added.

Moreover, in the case of 4 kbps, as shown in Table 2, 112 bits of the important bit group is handled as class I and the other 104 bits are handled as class II.

According to the 112 bits of class I, the CRC code calculation block 5 creates a CRC code of 14 bits. The convolution encoder 6 carries out a convolution coding using the 112 bits of class I, the 14-bit CRC code, and 10 table bit.

The 136 bits obtained by this convolution encoder 6 and the 104 bits of class II, i.e., the total of 240 bits, are subjected to a bit interleave and 2-frame interleave for transmission, thus realizing an audio coding with 4 kbps. It should be noted that when the transmission is actually carried out, other redundant bits are added.

Table 3 shows an allocation example of class I and class II in the case of 2 kbps. The class I is the important bit group allocated as protected bits and the class II is allocated non-protected bits. It should be noted that, the example given here is for one frame, 20 msec.

TABLE 3

| Parameters | Voiced | | | Unvoiced | | |
|---|---|---|---|---|---|---|
| | Number of protected bits | Number of non-protected bits | Total | Number of protected bits | Number of non-protected bits | Total |
| LSP0 | 6 | 0 | 6 | 6 | 0 | 6 |
| LSP2 | 0 | 6 | 6 | 3 | 3 | 6 |
| LSP3 | 0 | 5 | 5 | 0 | 5 | 5 |
| LSP4 | 1 | 0 | 1 | 1 | 0 | 1 |
| VUV | 2 | 0 | 2 | 2 | 0 | 2 |
| PCH | 6 | 1 | 7 | | | |
| idS0 | 0 | 4 | 4 | | | |
| idS1 | 0 | 4 | 4 | | | |
| idG | 5 | 0 | 5 | | | |
| idSL00 | | | | 0 | 6 | 6 |
| idSL01 | | | | 0 | 6 | 6 |
| idGL00 | | | | 4 | 0 | 4 |
| idGL01 | | | | 4 | 0 | 4 |
| Total | 20 | 20 | 40 | 20 | 20 | 40 |

Moreover, Table 4 shows an allocation example of class I and class II in the case of 4 kbps.

TABLE 4

| Parameters | Voiced | | | Unvoiced | | |
|---|---|---|---|---|---|---|
| | Number of protected bits | Number of non-protected bits | Total | Number of protected bits | Number of non-protected bits | Total |
| LSP0 | 6 | 0 | 6 | 6 | 0 | 6 |
| LSP2 | 6 | 0 | 6 | 3 | 3 | 6 |
| LSP3 | 0 | 5 | 5 | 0 | 5 | 5 |
| LSP4 | 1 | 0 | 1 | 1 | 0 | 1 |
| LSP5 | 0 | 8 | 8 | 0 | 8 | 8 |
| VUV | 2 | 0 | 2 | 2 | 0 | 2 |
| PCH | 6 | 1 | 7 | | | |
| idS0 | 1 | 3 | 4 | | | |
| idS1 | 1 | 3 | 4 | | | |
| idG | 5 | 0 | 5 | | | |
| idS0_4K | 0 | 7 | 7 | | | |
| idS1_4K | 0 | 10 | 10 | | | |
| idS2_4K | 0 | 9 | 9 | | | |
| idS3_4K | 0 | 6 | 6 | | | |
| idSL00 | | | | 0 | 6 | 6 |
| idSL01 | | | | 0 | 6 | 6 |
| idGL00 | | | | 4 | 0 | 4 |
| idGL01 | | | | 4 | 0 | 4 |
| idSL10 | | | | 0 | 5 | 5 |
| idSL11 | | | | 0 | 5 | 5 |
| idSL12 | | | | 0 | 5 | 5 |
| idSL13 | | | | 0 | 5 | 5 |
| idGL10 | | | | 2 | 1 | 3 |
| idGL11 | | | | 2 | 1 | 3 |
| idGL12 | | | | 2 | 1 | 3 |
| idGL13 | | | | 2 | 1 | 3 |
| Total | 28 | 52 | 80 | 28 | 52 | 80 |

The above Table 2 and Table 3 shows an allocation example of protected bits/non-protected bits, i.e., an allocation example of important bits for the hearing sense includes: some or all of a linear spectrum pair (LSP) parameters forming an outline of a frequency spectrum of the audio signal; all of the voiced (VB)/unvoiced (UV) decision parameters indicating whether the audio signal is voiced or unvoiced; some or all of the pitch parameters when the audio signal is voiced; some or all of the spectrum codebook index and gain index indicating the spectrum envelope of the linear prediction coding (LPC) residual signal when the audio signal is voiced; and some or all of the noise codebook index and gain index of the linear prediction coding (LPC) residual signal when the audio signal is unvoiced.

In a mobile telephone apparatus, in order to maintain a conversation quality, the first LSP parameter LSP0 is an LSP frequency approximated to an actual LSP coefficient obtained from the codebook. Because an accurate transmission is desired, all the 6 bits are handled as protected bits. Moreover, the VUV parameter serving as the V/UV decision parameter indicates a quality of the signal, and all of the two bits are protected. Moreover, the pitch parameter (PCH) is a basic frequency of the signal, and up to 6 of the 7 bits are protected. Moreover, in the case of voiced, the gain index of the codebook indicating the spectrum envelope of the LPC residual signal represents a sound level of the signal, and all of the 5 bits are protected because an accurate communication is desired.

That is, these important bits serve to maintain a communication quality at a certain level under an environment where a transmission path error is easily caused. This prevents occurrence of an abnormal sound which may be caused by a bit error.

Next, a detailed explanation will be given on the CRC code calculation by the CRC code calculation block 5 and the convolution coding by the convolution encoder 6.

Table 5 and Table 6 show an input bit order P[i] into a CRC creation polynominal for class I in the case of 2 kbps and class I in the case of 4 kbps. Here, the subscript "p" represents a parameter of a preceding frame. Moreover, bit 0 represents an LSB. In the case where two parameters are given in one Item, the parameter given in the upper column is for Voiced and the parameter given in the lower column is for Unvoiced.

TABLE 5

| i | Item | Bit | i | Item | Bit | i | Item | Bit |
|---|------|-----|---|------|-----|---|------|-----|
| 0 | LSP0p | 5 | 14 | idGp<br>idGL00p | 4<br>0 | 28 | PCHp<br>idGL01p | 5<br>0 |
| 1 | LSP0 | 5 | 15 | idG<br>idGL00 | 4<br>0 | 29 | PCH<br>idGL01 | 5<br>0 |
| 2 | LSP0p | 3 | 16 | idGp<br>LSP2p | 3<br>5 | 30 | VUVp | 0 |
| 3 | LSP0 | 3 | 17 | idG<br>LSP2 | 3<br>5 | 31 | VUV | 0 |
| 4 | LSP0p | 1 | 18 | idGp<br>LSP2p | 2<br>4 | 32 | LSP4p | 0 |
| 5 | LSP0 | 1 | 19 | idG<br>LSP2 | 2<br>4 | 33 | LSP4 | 0 |
| 6 | VUVp | 1 | 20 | idGp<br>LSP2p | 1<br>3 | 34 | LSP0p | 0 |
| 7 | VUV | 1 | 21 | idG<br>LSP2 | 1<br>3 | 35 | LSP0 | 0 |
| 8 | PCHp<br>idGL00p | 6<br>3 | 22 | idGp<br>idGL01p | 0<br>3 | 36 | LSP0p | 2 |
| 9 | PCH<br>idGL00 | 6<br>3 | 23 | idG<br>idGL01 | 0<br>3 | 37 | LSP0 | 2 |
| 10 | PCHp<br>idGL00P | 4<br>2 | 24 | PCHp<br>idGL01p | 1<br>2 | 38 | LSP0p | 4 |
| 11 | PCH<br>idGL00 | 4<br>2 | 25 | PCH<br>idGL01 | 1<br>2 | 39 | LSP0 | 4 |
| 12 | PCHp<br>idGL00p | 2<br>1 | 26 | PCHp<br>idGL01p | 3<br>1 | | | |
| 13 | PCH<br>idGL00 | 2<br>1 | 27 | PCH<br>idGL01 | 3<br>1 | | | |

TABLE 6

| i | Item | Bit | i | Item | Bit | i | Item | Bit |
|---|------|-----|---|------|-----|---|------|-----|
| 0 | LSP0p | 5 | 19 | idG<br>idGL10 | 0<br>1 | 38 | idGp<br>idGL01p | 3<br>3 |
| 1 | LSP0 | 5 | 20 | idS0p<br>idGL11p | 3<br>2 | 39 | idG<br>idGL01 | 33<br>3 |
| 2 | LSP0p | 3 | 21 | idS0<br>idGL11 | 3<br>2 | 40 | PCHp<br>idGL01p | 1<br>2 |
| 3 | LSP0 | 3 | 22 | LSP2p<br>idGL11p | 0<br>1 | 41 | PCH<br>idGL01 | 1<br>2 |
| 4 | LSP0p | 1 | 23 | LSP2<br>idGL11 | 0<br>1 | 42 | PCHp<br>idGL01p | 3<br>1 |
| 5 | LSP0 | 1 | 24 | LSP2p | 5 | 43 | PCH<br>idGL01 | 3<br>1 |
| 6 | VUVp | 1 | 25 | LSP2 | 5 | 44 | PCHp<br>idGL01p | 5<br>0 |
| 7 | VUV | 1 | 26 | LSP2p | 4 | 45 | PCH<br>idGL01 | 5<br>0 |
| 8 | PCHp<br>idGL00p | 6<br>3 | 27 | LSP2 | 4 | 46 | VUVp | 0 |
| 9 | PCH<br>idGL00 | 6<br>3 | 28 | LSP2p | 3 | 47 | VUV | 0 |
| 10 | PCHp<br>idGL00p | 4<br>2 | 29 | LSP2 | 3 | 48 | LSP4p | 0 |
| 11 | PCH<br>idGL00 | 4<br>2 | 30 | LSP2p<br>idGL12p | 2<br>2 | 49 | LSP4p | 0 |
| 12 | PCHp<br>idGL00p | 2<br>1 | 31 | LSP2<br>idGL12 | 2<br>2 | 50 | LSP0p | 0 |
| 13 | PCH<br>idGL00 | 2<br>1 | 32 | LSP2p<br>idGL12p | 1<br>1 | 51 | LSP0 | 0 |
| 14 | idGp<br>idGL00p | 4<br>1 | 33 | LSP2<br>idGL12 | 1<br>1 | 52 | LSP0p | 2 |
| 15 | idG<br>idGL00 | 4<br>0 | 34 | idS1p<br>isGL13p | 3<br>2 | 53 | LSP0 | 2 |
| 16 | idGp<br>idGL10p | 2<br>2 | 35 | idS1<br>idGL13 | 3<br>2 | 54 | LSP0p | 4 |
| 17 | idG<br>idGL10 | 2<br>2 | 36 | idS1p<br>isGL13p | 1<br>1 | 55 | LSP0 | 4 |
| 18 | idGp<br>idGL10p | 0<br>1 | 37 | idG<br>idGL13 | 1<br>1 | | | |

The CRC calculation block 5 uses a CRC polynominal shown in Equation (1) given below to obtain a CRC code for 7 bits per one frame, i.e., CRC [i].

[Equation 1]

$$R(x) = \sum_{i=0}^{6} CRC[i] \cdot x^i \tag{1}$$

However,

[Equation 2]

$$x^7 \sum_{i=0}^{N} P[i] \cdot x^i = Q(x) \cdot G_{CRC}(x) + R(x) \tag{2}$$

[Equation 3]

$$G_{CRC}(x) = 1 + x^4 + x^5 + x^6 + x^7 \tag{3}$$

In Equation (2) N=39 if 2 kbps, and N=55 if 4 kbps. Hereinafter, this is assumed unless otherwise specified.

Using the CRC code CRC[i] obtained from the aforementioned Equations (1) to (3) and the P[i] shown in Table 5 and Table 6, a input bit string CVin[i] into the convolution encoder 6 is created as shown in Equation (4) given below.

[Equation 4]

$$CV_{in}[i] = \begin{cases} CRC[6-2i] & (0 \le i \le 3) \\ P[i-4] & (4 \le i \le N+4) \\ CRC[2(i-N)-9] & (N+5 \le i \le N+7) \\ 0 & (N+8 \le i \le N+12) \end{cases} \tag{4}$$

The convolution encoder 6 is supplied with the input bit string CVin[i] and the aforementioned important bit group to execute a convolution coding using two creation polyominals shown in Equation (5) and Equation (6) below.

[Equation 5]

$$G_1(D) = i + D + D^3 + D^5 \quad (5)$$

[Equation 6]

$$G_2(D) = i + D^2 + D^3 + D^4 + D^5 \quad (6)$$

This convolution encoder 6 carries out the convolution coding, starting with G1(D) and alternately using the Equations (5) and (6).

Table 7 and Table 8 shows a bit order for class II of 2 kbps and 4 kbps. In this input order, the class II bits are combined with the coded output from the convolution encoder 6 for transmission.

TABLE 7

| i | Item | Bit | i | Item | Bit | i | Item | Bit |
|---|------|-----|---|------|-----|---|------|-----|
| 0 | LSP2p | 2 | 14 | LSP3p | 0 | 28 | LSP2p idSL00p | 4 4 |
| 1 | LSP2 | 2 | 15 | LSP3 | 0 | 29 | LSP2 idSL00 | 4 4 |
| 2 | LSP2p | 1 | 16 | idS0p idSL01p | 0 5 | 30 | LSP2p idSL00p | 3 3 |
| 3 | LSP2 | 1 | 17 | idS0 idSL01 | 0 5 | 31 | LSP2 idSL00 | 3 3 |
| 4 | LSP2p | 0 | 18 | idS1p idSL01p | 3 4 | 32 | PCHp idSL00p | 0 2 |
| 5 | LSP2 | 0 | 19 | idS1 idSL01 | 3 4 | 33 | PCH idSL00 | 0 2 |
| 6 | LSP3p | 4 | 20 | idS1p idSL01p | 2 3 | 34 | idS0p idSL00p | 3 1 |
| 7 | LSP3 | 4 | 21 | idS1 idSL01 | 2 3 | 35 | idS0 idSL00 | 3 1 |
| 8 | LSP3p | 3 | 22 | idS1p idSL01p | 1 2 | 36 | idS0p idSL00p | 2 0 |
| 9 | LSP3 | 3 | 23 | idS1 idSL01 | 1 2 | 37 | idS0 idSL00 | 2 0 |
| 10 | LSP3p | 2 | 24 | idS1p idSL01p | 0 1 | 38 | idS0p idSL01p | 1 0 |
| 11 | LSP3 | 2 | 25 | idS1 idSL01 | 0 1 | 39 | idS0 idSL01 | 1 0 |
| 12 | LSP3p | 1 | 26 | LSP2p idSL00p | 5 5 | | | |
| 13 | LSP3 | 1 | 27 | LSP2 idSL00 | 5 5 | | | |

TABLE 8

| i | Item | Bit | i | Item | Bit | i | Item | Bit |
|---|------|-----|---|------|-----|---|------|-----|
| 0 | LSP3 | 4 | 18 | idS1 idSL00 | 1 3 | 36 | idS1_4K idSL11 | 0 2 |
| 1 | LSP3 | 3 | 19 | idS1 idSL00 | 0 2 | 37 | idS2_4K idSL11 | 8 1 |
| 2 | LSP3 | 2 | 20 | idS0_4K idSL00 | 6 1 | 38 | idS2_4K idSL11 | 7 0 |
| 3 | LSP3 | 1 | 21 | idS0_4K idSL00 | 5 0 | 39 | idS2_4K idSL11 | 6 0 |
| 4 | LSP3 | 0 | 22 | idS0_4K idSL01 | 4 5 | 40 | idS2_4K idSL12 | 5 4 |
| 5 | LSP5 | 7 | 23 | idS0_4K idSL01 | 3 4 | 41 | idS2_4K idSL12 | 4 3 |
| 6 | LSP5 | 6 | 24 | idS0_4K idSL01 | 2 3 | 42 | idS2_4K idSL12 | 3 2 |
| 7 | LSP5 | 5 | 25 | idS0_4K idSL01 | 1 2 | 43 | idS2_4K idSL12 | 2 1 |
| 8 | LSP5 | 4 | 26 | idS0_4K idSL01 | 0 1 | 44 | idS2_4K idSL12 | 1 0 |
| 9 | LSP5 | 3 | 27 | idS1_4K idSL01 | 9 0 | 45 | idS2_4K idSL12 | 0 0 |
| 10 | LSP5 | 2 | 28 | idS1_4K idSL10 | 8 4 | 46 | idS3_4K idSL13 | 5 4 |
| 11 | LSP5 | 1 | 29 | idS1_4K idSL10 | 7 3 | 47 | idS3_4K idSL13 | 4 3 |
| 12 | LSP5 | 0 | 30 | idS1_4K idSL10 | 6 2 | 48 | idS3_4K idSL13 | 3 2 |
| 13 | PCH LSP2 | 0 2 | 31 | idS1_4K idSL10 | 5 1 | 49 | idS3_4K idSL13 | 2 1 |
| 14 | idS0 LSP2 | 2 1 | 32 | idS1_4K idSL10 | 4 0 | 50 | idS3_4K idSL13 | 1 0 |
| 15 | idS0 LSP2 | 1 0 | 33 | idS1 4K idSL10 | 3 0 | 51 | idS3 4K idSL13 | 0 0 |
| 16 | idS0 idSL00 | 0 5 | 34 | idS1_4K idSL11 | 2 4 | | | |
| 17 | idS1 idSL00 | 2 4 | 35 | idS1_4K idSL11 | 1 3 | | | |

It should be noted that in the 4 kbps class II bit order shown in Table 8, the number of bits is as large as 104. For a 2-frame set, only one frame is shown. Actually, bits of a preceding frame and a following frame are alternately arranged.

Next, in the aforementioned decoding apparatus, for example, after decoding a bit string which is a convolution-coded output received from a coding apparatus of another mobile telephone apparatus, the convolution decoder 16 carries out a convolution decoding, and the CRC code comparison & frame mask block 15 compares the CRC check code added to the convolution-decoded output from the convolution decoder 16, to a CRC error check code calculated from the bit group deleted by the important bit group, so as to adjust the convolution-decoded output according to the comparison result.

The CRC code comparison & frame mask block 15 carries out an error check step for checking a transmission error by using the aforementioned error check code added to the convolution-decoded output from the convolution decoding step executed by the convolution decoder 16; and an output adjustment step for adjusting the convolution-decoded output according to the error check result of the aforementioned error check step.

When the CRC code is not matched, audio decoding using the data of the frame results in a significant deterioration of the audio quality. If an error detection occurs repeatedly, parameter replacement is carried out before supplying so that an adjusted output is supplied to the audio decoder 17. The parameter replacement may be carried out by way of the bad frame masking.

Figure 4:
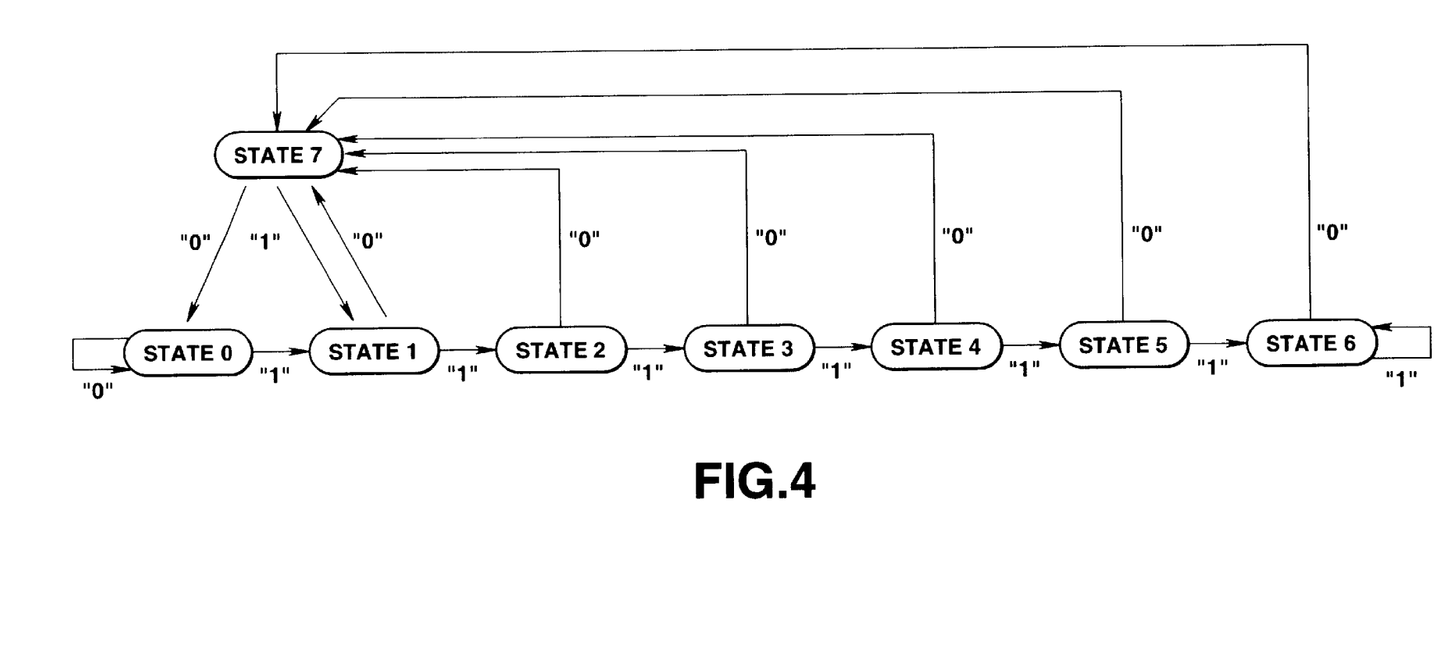
FIG. 4 shows a state transmission sequence for explaining the operation of a transmission path decoder constituting the mobile telephone apparatus.

FIG. 4 shows a state transition in the bad frame masking processing. According to the result of the CRC code check processing, the state variable of the current fame is changed. The states 0 to 7 are changed from one to another in the direction indicated by the arrow. The transmission starts at state 0 and proceeds in the direction of "1" if any error, and in the direction of "0" if no error.

Normally, state 0 indicates that there is no CRC error. For example, state 6 is reached if the CRC is unsatisfied six times successively. Moreover, at state 0, no processing is carried out. That is, a normal decoding is carried out.

For example, when decoding the aforementioned LSP parameters, at states 1 to 6, an LSP parameter of a preceding frame is used. Moreover, at state 7, if the LSP parameter is in straight mode, LSP0 to LSP5 are used; and if the LSP parameter is in a differential mode, only the 0-th LSP code index LSP0 is used.

Moreover, for example, according to the state variable "state" value, a mute variable "mute" is set as shown in Table 9 below for controlling an output sound volume. If the state variable is state=7, the mute (p) indicates the mute variable of a preceding frame.

TABLE 9

| state | mute |
|---|---|
| 0 | 1.000 |
| 1.2 | 0.800 |
| 3 | 0.500 |
| 4 | 0.250 |
| 5 | 0.125 |
| 6 | 0.000 |
| 7 | mute (p) |

Moreover, for example, if the VUV parameter is V, at state variable state=1 to 6, the spectdrum parameter idS0, idS1, the spectrum gain parameter idG, and the 4 kbps spectrum parameter idS0_4 k to idS3_4 k of a preceding frame are used.

Moreover, the frequency spectrum variable Am [00..44] of the residual signal is made as shown in Equation (7) so as to control an output sound volume. Here, the Am [i] obdtained from the parameter is made $Am_{(org)}[i]$.

[Equation 7]

$$Am[i]=mute*Am_{(org)}[i](0 \leq i \leq 159) \qquad (7)$$

Moreover, for example, if the VUV decision parameter is UV, at the state variable 1 to 6, the noise codebook gain parameter idGL00, idGL01 and the 4 kbps noise codebook gain parameter idGL10 to idGL13 of a preceding frame are used. As for the noise codebook parameter idSL00, idSL01, and the 4 kbps noise codebook parameter idSL10 to idSL13, random numbers generated within a range of each number of bits are used.

Moreover, the residual signal res [00..159] is made as shown Equation (8). Here the res [i] obtained from the parameter is made $res_{(org)}[i]$.

[Equation 8]

$$res[i]=mute*res_{(org)}[i](0 \leq i \leq 159) \qquad (8)$$

The convolution-coded output which has been subjected to the bad frame masking by the CRC code comparison & frame mask block 15 is supplied to the audio decoder 17.

Figure 5:
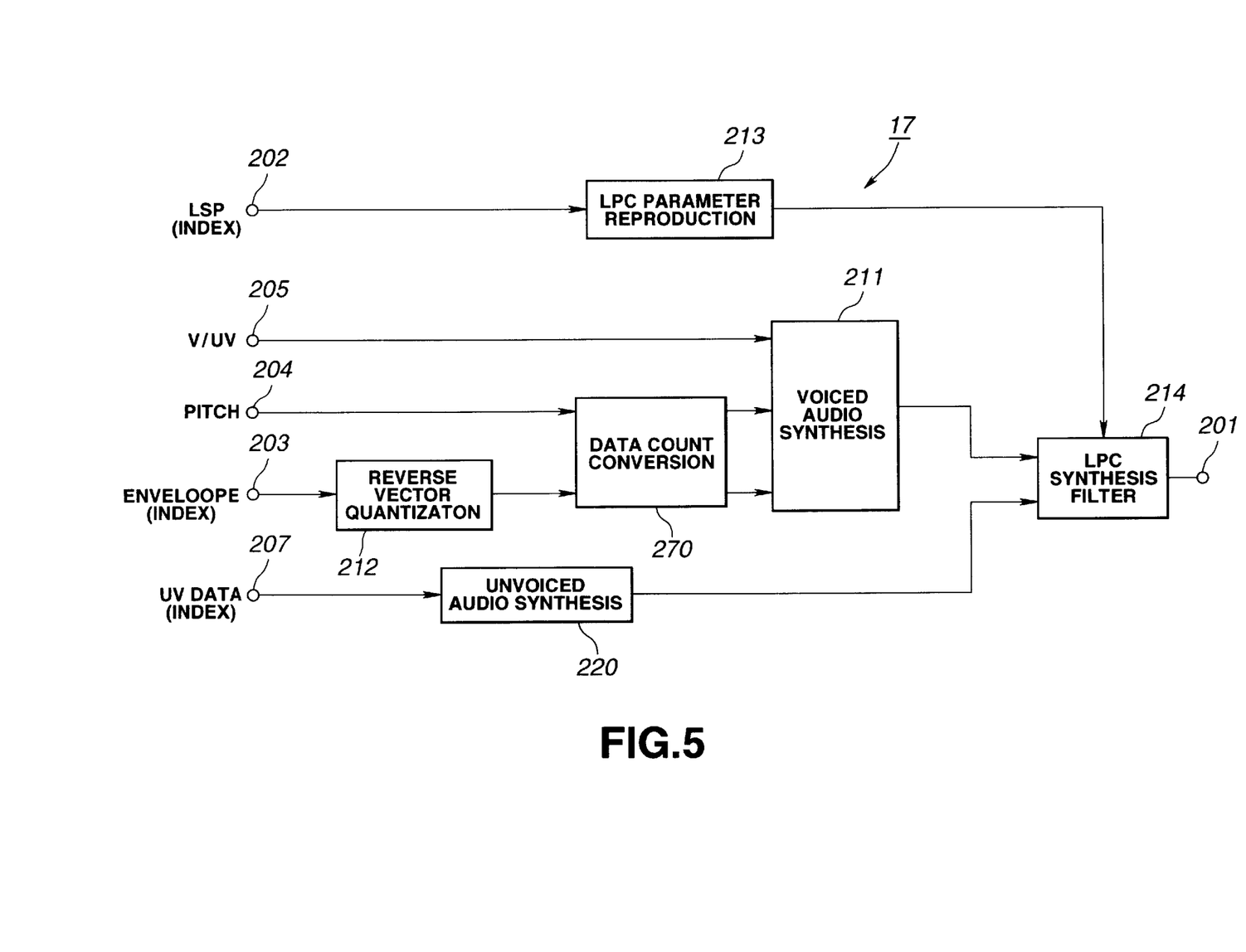
FIG. 5 is a block diagram showing a basic configuration of an audio decoder constituting the mobile telephone apparatus.
Figure 6:
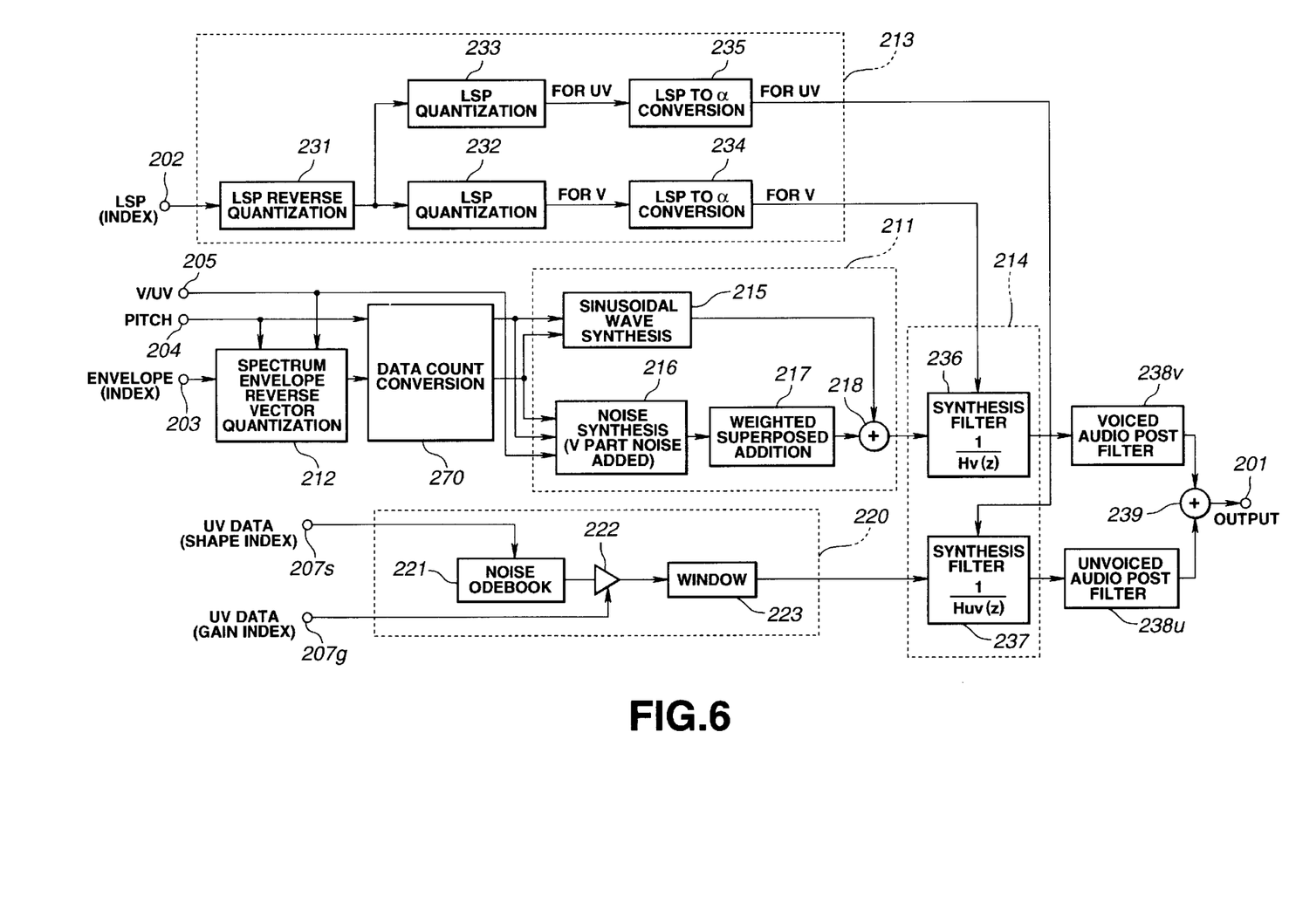
FIG. 6 is a block diagram showing a detailed configuration of the audio decoder.

The audio decoder 17 has a configuration as shown in FIG. 5 and FIG. 6. The CRC code comparison & frame mask block 15 outputs: via a terminal 202 a codebook index corresponding to a quantized output of the aforementioned LSP (linear spectrum pair) from the terminal 102 of FIG. 3; via terminals 203, 204, and 205, an index, pitch, and V/UV decision as the envelop quantized output corresponding to the outputs from the terminals 103, 104, and 105 of FIG. 3; and via a terminal 207, an index as a UV (unvoiced) data corresponding to the output from the terminal 107 of FIG. 3. Furthermore, the CRC error signal obtained as a result of the CRC check by the CRC code comparison & frame mask block 15 is supplied to an unvoiced audio synthesis block 220.

The index as the envelope quantized output from the terminal 203 is fed to a reverse vector quantizer 212 so as to be subjected to a reverse vector quantization to obtain a spectrum envelope of the LPC residue, which is fed to a voiced audio synthesis block 211 via a data count conversion block 270. The voiced audio synthesis block 211 synthesizes the LPC (linear prediction coding) residue of the voiced part by way of sinusoidal wave synthesis. This voiced audio synthesis block 211 is also supplied with the pitch and the V/UV decision output from the terminals 204 and 205. The voiced LPC residue from the voiced audio synthesis block 211 via a data count conversion block 270 is fed to an LPC synthesis filter 214. Moreover, the UV data index from the terminal 207 is fed to the unvoiced audio synthesis block 220 where a noise codebook is referenced to take out an LPC residue as an excitation vector of the unvoiced part. This LPC residue is also fed to the LPC synthesis filter 214. In the LPC synthesis filter 214, LPC residue of the voiced part and the LPC residue of the unvoiced part are subjected to an LPC synthesis processing independently from each other. Alternatively, it is also possible the LPC residue of the voiced part is added to the LPC residue of the unvoiced part so as to be together subjected to the LPC synthesis processing. Here, the LSP index from the terminal 202 is fed to an LPC parameter reproduction block 213 where an α parameter of the LPC is taken out and fed to the lPC synthesis filter 214. An audio signal obtained by the LPC synthesis by the LPLC synthesis filter is outputted from an output terminal 201.

Next, FIG. 6 shows a more specific configuration of the audio decoder 17 of FIG. 5. In this FIG. 6, like components as in FIG. 5 are denoted by like reference symbols.

In this FIG. 6, the input terminal 202 is supplied with a so-called codebook index, i.e., an LSP vector-quantized output corresponding to an output from the output terminal 102 of FIG. 2 and FIG. 3 via the aforementioned CRC code comparison & frame mask block 15.

This LSP index is fed to a reverse vector quantizer 231 of an LPC parameter reproduction block 213 and subjected to a reverse vector quantization into an LSP (linear spectrum pair), which is fed o LSP interpolation circuits 232, 233, where an LSP interpolation processing is carried out. After this, the obtained data is fed to LSP to α conversion circuits 234 and 235 so as to be converted into an α parameter of LPC (linear prediction code). This α parameter is fed to the LPC synthesis filter 214. Here, the LSP interpolation circuit 213 and the LSP to α conversion circuit 234 are for the voiced (V), and the LSP interpolation circuit 233 and the LSP to α conversion circuit 235 are for the unvoiced (UV). Moreover, the LPC synthesis filter 214 consists of an LPC synthesis filter 236 for the voiced and an LPC synthesis filter 237 for the unvoiced. That is, the voiced and the unvoiced are subjected to an LPC coefficient interpolation independently from each other, so as to prevent an adverse effect caused by interpolation between LSP's having completely different characteristics at a transient part from the voiced to the unvoiced or from the unvoiced to the voiced.

Moreover, an input terminal 203 of FIG. 4 is supplied with a spectrum envelope (Am) code index data which has been subjected to weighting vector quantization that corresponds to the output from the terminal 1303 of the encoder shown in FIG. 2 and FIG. 3 via the aforementioned CRC code comparison & frame mask block 15. An input terminal 204 of FIG. 4 is supplied with a pitch data from the terminal 104 of FIG. 2 and FIG. 3 via the CRC code comparison & frame mask block 15. An input terminal 205 of FIG. 4 is supplied with the V/UV decision data from the terminal 105 of FIG. 2 and FIG. 3 via the CRC code comparison & frame mask block 15.

The vector-quantized index data of the spectrum envelope Am s fed to a reverse vector quantizer 212 so as to be subjected to a reverse quantization, i.e., a reverse conversion corresponding to the aforementioned data count conversion, and supplied as a spectrum envelope data to a sinusoidal wave synthesis circuit 215 of a voiced audio synthesis block 211.

It should be noted that in case an inter-frame difference is determined prior to the vector quantization of a spectrum during an encoding, the reverse vector quantization here is followed by decoding of the inter-frame difference so as to obtain a data on the spectrum envelope.

The sinusoidal wave synthesis circuit 215 is supplied with the pitch from the input terminal 204 and the V/UV decision data from the input terminal 205. The sinusoidal wave synthesis circuit 215 outputs an LPC residue data corresponding to the output from the LPC reverse filter 111 of FIG. 2 and FIG. 3, which data is fed to an adder 218. A specific method of this sinusoidal wave synthesis is disclosed, for example, in the Specification and Drawings of Japanese Patent Application 4-91422 filed by the inventor of the present invention, or in the Specification and Drawings of Japanese Patent Application 6-198451.

Moreover, the envelope data from the reverse vector quantizer 212, the pitch data from the input terminal 204, and the V/UV decision data from the input terminal 205 are fed to a noise synthesis circuit 216 for noise addition for the voiced (V) part. This noise synthesis circuit 216 outputs a data which is fed via a weighted superposed adder circuit 217 to an adder 218. This is based on the fact as follows. When excitation of a voiced audio is created as an input to the LPC synthesis filter by the sinusoidal wave synthesis, feeling of nasal congestion is caused by a low pitch sound such as a man's voice, or feeling of an unnatural voice is caused if the sound quality is drastically changed from the voiced to the unvoiced. For this, the voiced part of the LPC residue signal is added by a noise, taking consideration on parameters based on the audio coded data such as pitch, spectrum envelope amplitude, maximum amplitude within a frame, the residual signal level, and the like.

An output from the adder 218 is fed to a voiced audio synthesis filter 236 of the LPC synthesis filter 214 for LPC synthesis processing into a time waveform data, which is fed to a voiced audio post filter 238$v$ so as to be subjected to a filter processing before supplied to an adder 239.

Next, input terminals 207$s$ and 207$g$ of FIG. 6 are supplied with the UV data, i.e., a shape index and a gain index from the output terminals 107$s$ and 107$g$ of FIG. 3, respectively, and the data is fed to an unvoiced audio synthesis block 220. The shape index from the terminal 207$s$ is fed to a noise codebook 221 of the unvoiced audio synthesis block 220, and the gain index from the terminal 207$g$ is fed to a gain circuit 222. An representative value output which is read out from the noise codebook 221 is a noise signal component corresponding to the LPC residue of the unvoiced, and this is used as a predetermined gain amplitude in the gain circuit 222 and fed to a window circuit 223 so as to be subjected to a window processing for smoothing the linkage portion with the voiced part.

An output from the window circuit 223 is fed as an output from the unvoiced audio synthesis block 220 to an unvoiced audio synthesis filter 237 of the LPC synthesis filter 214. In the synthesis filter 237, an LPC synthesis processing is carried out to obtain a time waveform data of the unvoiced part, which is subjected to a filter processing in an unvoiced audio post filter 238$u$ before fed to an adder 239.

In the adder 239, the time waveform signal of the voiced part from the voiced audio post filter 238$v$ is added to the time waveform data of the unvoiced part from the unvoiced audio post filter 238$u$ for output from the output terminal 201.

The audio decoded output from the output terminal 201 is converted by the D/A converter 18 into an analog audio signal, which is outputted as a sound from a loudspeaker 19.

Figure 7:
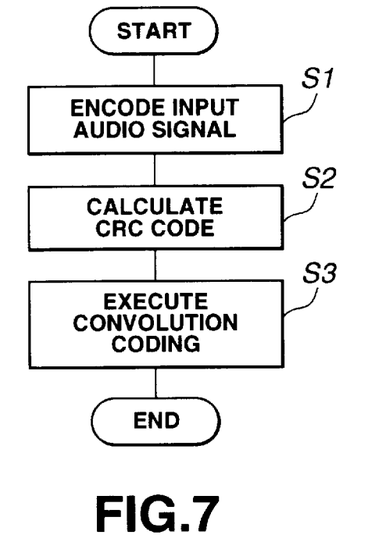
FIG. 7 is a flowchart for explaining a coding method carried out by the mobile telephone apparatus.
Figure 8:
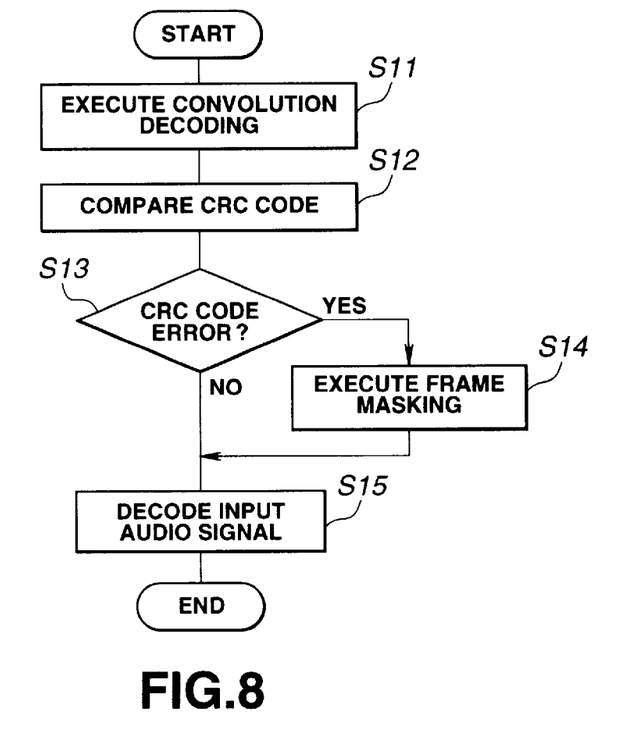
FIG. 8 is a flowchart for explaining a coding method carried out by the mobile telephone apparatus.

FIG. 7 and FIG. 8 are flowcharts showing the audio coding method and the audio decoding step carried by the aforementioned mobile telephone apparatus.

That is, the audio coding processing carried out by the coding apparatus of the mobile telephone apparatus includes: step S1 for coding an input audio signal; step S2 for selecting an important bit group for the hearing sense from a plurality of audio coding parameters from the step S1 and calculating a CRC check code from this important bit group; and step S3 for executing a convolution coding to the CRC check code obtained in step S2 and the important bit group.

Moreover, the audio decoding processing carried out by the decoding apparatus of the mobile telephone apparatus includes: step S11 for executing a convolution decoding to an convolution-coded output from another mobile telephone apparatus; step S12 for executing a CRC error check using the CRC check code added to the convolution-decoded output from the step S11; step S13 for deciding whether the CRC code has an error; if an error is detected in step S13, control is passed to step S14 for executing a bad frame masking processing; and step S15 for executing an audio decoding.

Thus, in the mobile telephone apparatus employing the coding method and apparatus according to the present invention as the transmission path encoder 4 and the encoder 3 at the transmission side, it is possible to output a coded data which guards against a transmission path error.

Moreover, in the mobile telephone apparatus employing the decoding method and apparatus according to the present invention as the transmission path decoder and the audio decoder, it is possible to decode an audio in which quality detioration due to a transmission path error is suppressed.

The coding method and apparatus according to the present invention can output a coded data that is tough against a transmission path error.

Moreover, the decoding method and apparatus according to the present invention can decode an audio in which quality deterioration due to a transmission path error is suppressed.

What is claimed is:

1. A coding method comprising:
   an audio coding step for dividing on a time axis on an input audio signal into predetermined coding units and coding each of said predetermined coding units so as to output a plurality of types of audio coded parameters, wherein said audio coding step includes:
   a short period prediction residue calculation step for obtaining a short period prediction residue of said input audio signal,
   a sinusoidal wave analysis coding step for executing sinusoidal wave analysis coding on said short period prediction residue obtained in said calculation step, and
   a waveform coding step for coding said input audio signal by using waveform coding;
   a channel error detection code creation step for selecting important bits relative to human hearing from said plurality of types of audio coded parameters from said audio coding step and for creating a channel error check code from said selected important bits; and
   a convolution coding step for executing a convolution coding with said channel error check code and said selected important bits from said channel error check code creation step, wherein said channel error check code creation step selects as said important bits: at least some parameters created when said short period prediction residue is obtained in said short period prediction residue calculation step, at least some coded outputs of said sinusoidal wave analysis coding step, and at least some coded outputs from said waveform coding step, and creates said channel error check code from said important bits.

2. The coding method as claimed in claim 1, wherein said parameters created to obtain a short period prediction residue by said short period residue calculation step are line spectrum pair parameters forming an outline of a frequency spectrum of said input audio signal; coded outputs of said sinusoidal wave analysis coding step include a voiced/unvoiced decision parameter indicating whether said input audio signal is voiced or unvoiced audio and a pitch parameter if said input audio signal is voiced, and a spectrum codebook index and gain index indicating a spectrum envelope of said short period prediction coding residue signal; and coded output of said waveform coding step are a noise codebook index and gain index based on a short period prediction residue when said input audio signal in unvoiced.

3. The coding method as claimed in claim 2, wherein said plurality of types of audio coded parameters include voiced/unvoiced decision parameters, pitch parameters, and said step of creating a channel error check code selects as said important bits: at least some linear spectrum pair parameters created when said short period prediction residue is obtained by said short period prediction residue calculation step; all of the voiced/unvoiced decision parameters; at least some of the pitch parameters; at least some spectrum envelope gain parameters of a short period prediction residue signal which is a coded output from said sinusoidal wave analysis coding step; and at least some noise codebook gain parameters which are waveform-coded outputs of said short period prediction residue, and creates said channel error check code from said important bits.

4. The coding method as claimed in claim 1, wherein said audio coding step carries out 2 k/4 kbps audio coding on said input audio signal.

5. A coding apparatus comprising:
audio coding means for dividing on a time axis an input audio signal into predetermined coding units and coding each of said predetermined coding units so as to output a plurality of types of audio coded parameters;
short period prediction residue calculation means for obtaining a short period prediction residue of said input audio signal; sinusoidal wave analysis coding means for executing sinusoidal wave analysis coding on said short period prediction residue obtained in said calculation means;
waveform coding means for coding said input audio signal by using waveform coding;
channel error check code creation means for selecting important bits relative to human hearing from said plurality of types of audio coded parameters from said audio coding means and creating a channel error check code from said selected important bits; and
convolution coding means for executing a convolution coding with said channel error check code and said important bits from said channel error check code creation means, wherein said channel error check code creation means selects as said important bits: at least some parameters created when said short period prediction residue is obtained in said short period prediction residue calculation means, at least some coded outputs of said sinusoidal wave analysis coding means, and at least some coded outputs from said waveform coding means, and creates said channel error check code from said important bits.

6. A decoding method for decoding coded data obtained from an input audio signal which has been divided on a time axis into predetermined units which have been coded to obtain a plurality of types of audio coded parameters from which important bits relative to human hearing have been used to create a channel error check code, wherein said channel error check code and said important bits relative to human hearing have been subjected to a convolution coding to obtain a convolution-coded output which has been adjoined with non-important bits for transmission, said decoding method comprising:
a convolution decoding step for executing a convolution decoding to said convolution-coded output to obtain a convolution-decoded output from said important bits, said error check code and said non-important bits;
a channel error check step for checking a transmission error using said channel error check code added to said convolution-decoded output from said convolution decoding step;
an output adjustment step for adjusting said convolution-decoded output according to a result of said channel error checking in said channel error check step; and
an audio decoding step for executing audio decoding processing on said convolution-decoded output from said output adjustment step, wherein said plurality of audio coded parameters include a short period prediction residue of said input audio signal, voiced/unvoiced decision parameters, pitch parameters, and sinusoidal wave analysis parameters from said short term prediction residue, and wherein said error check step selects as said important bits: at least some linear spectrum pair parameters created when said short period prediction residue is obtained; all of the voiced/unvoiced decision parameters; at least some of the pitch parameters; at least some of the pitch parameters of a short period prediction residue signal which is a coded output from said sinusoidal wave analysis parameters; and at least some noise codebook gain parameters which are waveform-coded outputs of said short period prediction residue, and compares a channel error check code created from said important bits with said channel error check code obtained from said convolution-coded output to detect a transmission error.

7. The decoding method as claimed in claim 6, wherein if a transmission error is detected in said channel error check step, said output adjustment step outputs interpolated data obtained by an interpolation processing instead of said convolution-decoded output.

8. The decoding method as claimed in claim 6, wherein said output adjustment step executes bad-frame masking processing on said convolution-decoded output according to a result of said channel error check step.

9. The decoding method as claimed in claim 6, wherein said coded data is obtained by executing a 2 k/4 kbps audio coding on said input audio signal.

10. A decoding apparatus for decoding coded data obtained from an input audio signal which has been divided on a time axis into predetermined units which have been coded to obtain a plurality of types of audio coded parameters from said important bits relative to human hearing have been used to create a channel error check code, wherein said channel error check code and said important bits have been subjected to a convolution coding to obtain a convolution-coded output which has been adjoined with non-important bits for transmission, said decoding apparatus comprising:

convolution decoding means for executing convolution decoding on said convolution-coded output to obtain a convolution-decoded output from said important bits added with said channel error check code and said non-important bits;

channel error check and output adjustment means for checking a transmission error using said channel error check code added to said convolution-decoded output from said convolution decoding means and adjusting said convolution-decoded output according to a result of said channel error check; and audio decoding means for executing audio decoding processing on said convolution-decoded output from said channel error check and output adjustment means, wherein said plurality of audio coded parameters include a short period prediction residue of said input audio signal, voiced/unvoiced decision parameters, pitch parameters, and sinusoidal wave analysis parameters from said short term prediction residue, and wherein said channel error check means selects as said important bits: at least some linear spectrum pair parameters created when said short period prediction residue is obtained: all of the voiced/unvoiced decision parameters; at least some of the pitch parameters of a short period prediction residue signal which is a coded output from said sinusoidal wave analysis parameters; and at least some noise codebook gain parameters which are waveform coded outputs of said short period prediction residue, and uses a channel error check code created from said important bits and said channel error check code obtained from said convolution coded output to detect a transmission error.

* * * * *